Dec. 28, 1943.    G. GRIKSCHEID    2,337,812
AIRPLANE
Filed Aug. 20, 1941    2 Sheets-Sheet 1

Inventor
GEORGE GRIKSCHEID

By *Clarence A. O'Brien*

Attorney

Dec. 28, 1943.   G. GRIKSCHEID   2,337,812
AIRPLANE
Filed Aug. 20, 1941   2 Sheets-Sheet 2
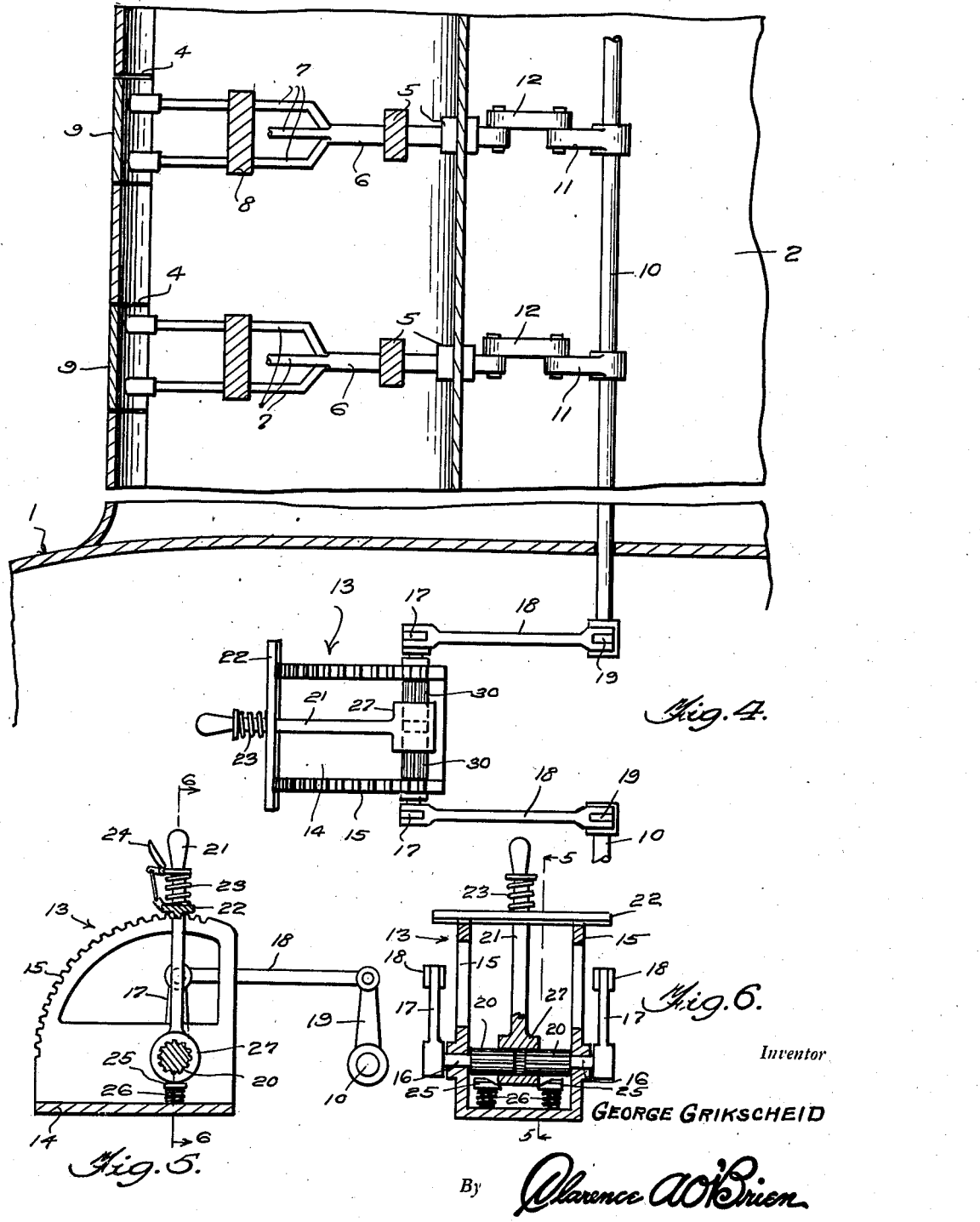
Inventor
GEORGE GRIKSCHEID
By Clarence A. O'Brien
Attorney Patented Dec. 28, 1943

2,337,812

UNITED STATES PATENT OFFICE 2,337,812

AIRPLANE

George Grikscheid, San Diego, Calif.

Application August 20, 1941, Serial No. 407,639

3 Claims. (Cl. 244—40)

The present invention relates generally to new and useful improvements in airplanes and has for its primary object to provide, in a manner as hereinafter set forth, a craft of this character comprising novel braking means incorporated in the wings thereof.

Another very important object of the invention is to provide an airplane braking apparatus of the character described which is provided with unique operating means whereby the braking means in either or both wings may be caused to function.

Other objects of the invention are to provide an airplane braking means of the aforementioned character which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a fragmentary view in horizontal section, taken substantially on the line 4—4 of Figure 3.

Figure 5 is a view in vertical longitudinal section through the operating means, taken substantially on the line 5—5 of Figure 6.

Figure 6 is a vertical sectional view, taken substantially on the line 6—6 of Figure 5.

Figure 1:
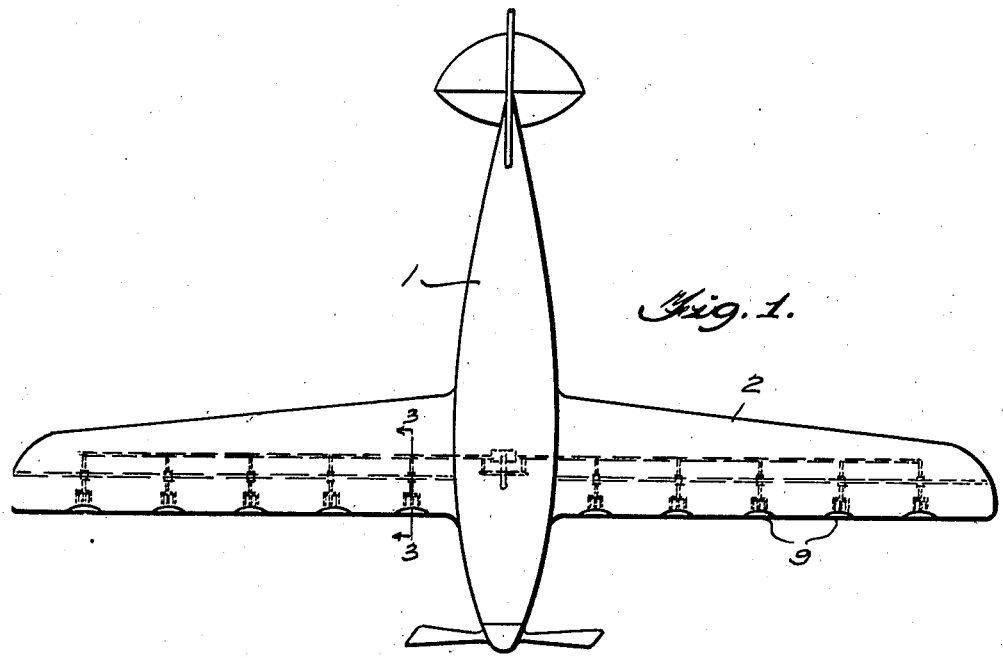
Figure 1 is a plan view of an airplane constructed in accordance with the present invention.
Figure 2:
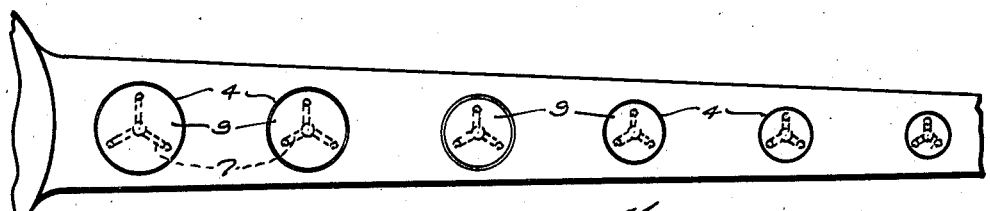
Figure 2 is a view in front elevation of a wing portion.
Figure 3:
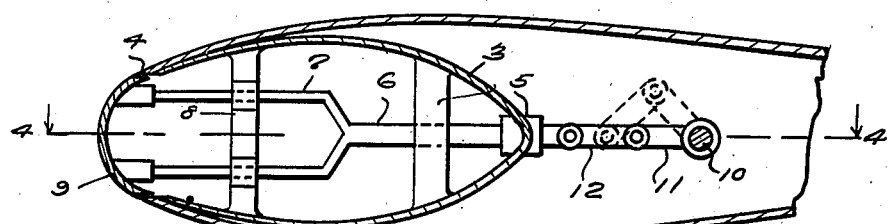
Figure 3 is a fragmentary view in vertical section, taken substantially on the line 3—3 of Figure 1.

Referring now to the drawings in detail, it will be seen that the embodiment of the invention which has been illustrated comprises a fuselage 1. Projecting from the fuselage 1 are wings 2. Mounted in the front portions of the wings 2 is an air trap chamber 3 which, as illustrated to advantage in Figure 3 of the drawings, is substantially ovate in cross section. The leading edges of the wings 2 have formed therein spaced ports or openings 4 which communicate with the chambers 3.

Slidable in bearings 5 in the chambers 3 and projecting rearwardly from said chambers into the wings 2 are rods 6. On the forward ends of the rods 6 are parallel fingers 7 which are slidable in guides 8 provided therefor in the chambers 3. Mounted on the forward ends of the fingers 7 are valves or closures 9 which control the ports 4. The valves or closures 9, it will be observed, conform to the curvature of the leading edges of the wings 2.

Journaled in the wings 2 rearwardly of the chambers 3 are shafts 10. Arms 11 are fixed on the shafts 10 at spaced points. Links 12 connect the rods 6 to the arms 11 for actuation by the shafts 10. Thus, the valves 9 are moved longitudinally for controlling the ports 4.

Mounted in the cockpit of the fuselage 1 is an operating unit which is designated generally by the reference numeral 13. In the arrangement shown, the unit 13 includes a plate 14 from which a pair of spaced quadrants 15 rise. Journaled in the quadrants 15 are shafts 16 (see Fig. 6). Fixed on the outer end portions of the shafts 16 are arms 17. Rods 18 connect the arms 17 to arms 19 on the inner end portions of the shafts 10.

Fixed on the inner end portions of the shafts 16 are gears 20. Splined on the gears 20 is a hand lever 21. A latching bar 22 is slidably mounted on the operating lever 21. A coil spring 23 engages the bar 22 with the quadrants 15 for releasably securing the lever 21 in adjusted position. A release lever 24 is provided on the operating lever 21 for disengaging the bar 22 from the quadrants 15 against the tension of the coil spring 23.

Mounted beneath the gears 20 and engageable therewith are keepers 25. Springs 26 engage the keepers 25 with the gears 20 for locking said gears against rotation. The inner end portions of the keepers 25 are beveled in a manner to form cams with which the hub or eye 27 of the lever 21 is engageable for disengaging said keepers from the gears 20.

It is thought that the operation of the invention will be readily apparent from a consideration of the foregoing. Briefly, with the lever 21 in the position illustrated in Figure 6 of the drawings, both of the gears 20 will be actuated upon swinging movement of said lever. To swing the lever 21, the bar 22 is raised to inoperative position against the tension of the coil spring 23 through the medium of the lever 24. Upon swinging movement of the lever 21 the shafts 10 are rocked in a manner to retract the valves 9 thereby opening the ports 8. Air now enters the chambers 3 where it is trapped and with resistance thus increased the forward speed of the plane is decreased. The valves 9 may be adjusted as desired. As shown, the hub or eye 27 of the lever 21 maintains both of the keepers 25 in inoperative position thereby permitting rotation of both of the gears 20 when it is desired to open or close the valves in both wings simultaneously. Should it be desired to adjust the valves in only one of the wings, the lever 21 is shifted laterally in that direction thereby permitting the keeper 25 on the other side to engage its respective gear 20 and lock the valves in the other wing. The bar 22 is of sufficient length to engage the quadrants 15 when the lever 21 is shifted laterally. Any suitable arrangement of braces or struts may be provided in the rear portions of the wings 2 for strengthening said wings and maintaining proper balance.

It is believed that the many advantages of an airplane constructed in accordance with the present invention will be readily understood, and although a preferred embodiment is as illustrated and described, it is to be understood that changes in the details of construction and in the combination and arrangement of parts may be resorted to which will fall within the scope of the invention as claimed.

What is claimed is:

1. An airplane comprising a fuselage, wings projecting from said fuselage, elongated trap chambers in the wings paralleling the leading edges thereof, the leading edges of said wings having ports therein communicating with the chambers, reciprocating valves operable in the chambers for controlling the ports, and means for actuating said valves.

2. An airplane comprising a fuselage, wings projecting from said fuselage, elongated air trap chambers in the forward portions of said wings paralleling the leading edges thereof, the leading edges of the wings having ports therein communicating with the chambers, shafts rotatably mounted in the wings in parallelism with the chambers, valves slidably mounted in the chambers for controlling the ports, means operatively connecting said valves to the shafts for actuation thereby, a manually operable lever in the fuselage, and means for operatively connecting said lever to either or both of the shafts.

3. An airplane comprising wings, said wings having air intake ports therein, valves for controlling the ports, shafts operatively connected to said valves, a pair of longitudinally aligned shafts operatively connected to the first-named shafts, gears on the adjacent ends of the second-named shafts, spring actuated locking devices engageable with said gears, a hand lever including an eye splined on the gears for actuating either or both of the first-named shafts, said eye being engageable with the locking devices for disengaging said locking devices from the gears, and means for releasably securing the lever in adjusted position.

GEORGE GRIKSCHEID.